US012734825B2

(12) United States Patent
Maekawara

(10) Patent No.: US 12,734,825 B2
(45) Date of Patent: Sep. 15, 2026

(54) IMAGE FORMING SYSTEM, IMAGE FORMING METHOD, AND RECORDING MEDIUM

(71) Applicant: Konica Minolta, Inc., Tokyo (JP)

(72) Inventor: Minoru Maekawara, Hino (JP)

(73) Assignee: Konica Minolta, Inc., Tokyo (JP)

( * ) Notice: Subject to any disclaimer, the term of this patent is extended or adjusted under 35 U.S.C. 154(b) by 250 days.

(21) Appl. No.: 18/443,586

(22) Filed: Feb. 16, 2024

(65) Prior Publication Data

US 2024/0278586 A1 Aug. 22, 2024

(30) Foreign Application Priority Data

Feb. 17, 2023 (JP) ................................ 2023-023147

(51) Int. Cl.

*B41J 2/21* (2006.01)
*B41J 29/20* (2006.01)
*B41J 29/393* (2006.01)

(52) U.S. Cl.

CPC ............. *B41J 2/2142* (2013.01); *B41J 29/20* (2013.01); *B41J 29/393* (2013.01); *B41J 2203/01* (2020.08)

(58) Field of Classification Search

CPC ...... B41J 2/2142; B41J 2/2139; B41J 2/0451; B41J 29/393; B41J 2203/01; B41J 2/16579; B41J 2029/3935; B41J 29/20

See application file for complete search history.

(56) References Cited

U.S. PATENT DOCUMENTS

2018/0086049 A1* 3/2018 Ueshima ................ B41J 2/2142

FOREIGN PATENT DOCUMENTS

JP 2017-177583 A 10/2017

* cited by examiner

*Primary Examiner* — Jannelle M Lebron

(74) *Attorney, Agent, or Firm* — Osha Bergman Watanabe & Burton LLP

(57) ABSTRACT

An image forming system includes an image forming device that ejects ink from a nozzle based on image data and performs image forming processing to form an image on a printing medium, a read image generator that generates a read image from the image on the printing medium, and an inspection device that detects an abnormal image from an inspection image that is the read image of an image to be inspected, and after detecting the abnormal image, based on the read image of the printing medium on which an abnormal nozzle detection image is formed by the image forming device, detects the nozzle in which an abnormality occurs as an abnormal nozzle.

18 Claims, 11 Drawing Sheets

IMAGE FORMING SYSTEM, IMAGE FORMING METHOD, AND RECORDING MEDIUM

CROSS-REFERENCE TO RELATED APPLICATION

The entire disclosure of Japanese patent Application No. 2023-023147, filed on Feb. 17, 2023, including description, claims, drawings and abstract is incorporated herein by reference.

BACKGROUND

Technical Field

The present invention relates to an image forming system, an image forming method, and a recording medium.

Description of Related Art

As a technique for performing high-speed printing using an inkjet head, a technique called single pass inkjet printing has been known and used. The technique improves the printing speed by configuring a line head including a plurality of inkjet nozzles arranged in the width direction of a recording sheet and passing the recording sheet under the line head. However, when there is an abnormality in a nozzle that ejects ink, a defect such as a streak or an omission occurs in a printed product. Hence, in image forming apparatuses such as inkjet printers or light emitting diode (LED) printers, analysis of a read image acquired by reading a printed product by a line sensor or the like is performed. In the method of analyzing the read image acquired by reading the printed product, an image defect can be detected, however the abnormal nozzle causing the image defect cannot be identified.

Japanese Unexamined Patent Publication No. 2017-177583 discloses a technique, in which an inspection chart for all of the nozzles is periodically printed on a printing medium to detect an abnormal nozzle based on the inspection chart, and when the abnormal nozzle is detected, a head cleaning operation is performed, and thereafter recovery printing is performed.

However, as disclosed in Japanese Unexamined Patent Publication No. 2017-177583, in the method of periodically detecting an abnormal nozzle, the printing operation continues even after an abnormality occurs in a nozzle until the next detection timing for the abnormal nozzle. This leads to the mass-production of the printed products having the abnormality. In addition, the inspection chart has been printed even in a situation where there is no abnormal nozzle, which leads to wasteful consumption of ink and a printing medium.

SUMMARY

One or more embodiments of the present invention reduce occurrence of the abnormal printed product due to the abnormal nozzle with less frequent abnormal nozzle detection by performing the abnormal nozzle detection upon occurrence of an abnormality in an image formed on the printing medium.

An image forming system that reflects one aspect of the present invention includes an image former (i.e., an image forming device) that ejects ink from a nozzle based on image data to form an image on a printing medium, a read image generator (e.g., a scanner) that generates a read image from the image on the printing medium, an abnormal image detector (i.e., an inspection device) that detects an abnormal image from an inspection image, which is the read image of an image to be inspected, and an abnormal nozzle detector (i.e., the inspection device) that detects, based on the read image of the printing medium on which an abnormal nozzle detection image is formed by the image former after detection of the abnormal image, the nozzle in which an abnormality occurs as an abnormal nozzle.

Note that the above-described image forming system is one aspect of the present invention, and an image forming method that reflects one aspect of the present invention and a non-transitory computer readable recording medium storing instructions that reflects one aspect of the present invention are also configured in the same manner as the above-described image forming system.

BRIEF DESCRIPTION OF THE DRAWINGS

The advantages and features provided by one or more embodiments of the invention will become more fully understand from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to the disclosed embodiments.

In this specification and the drawings, constituent elements having substantially the same functions or configurations are denoted by the same reference signs, and redundant description of the constituent elements will be omitted.

First Embodiment

<Configuration of Image Forming System>

First, an overall configuration of an image forming system according to a first embodiment of the present invention will be described with reference to FIG. 1.

Figure 1:
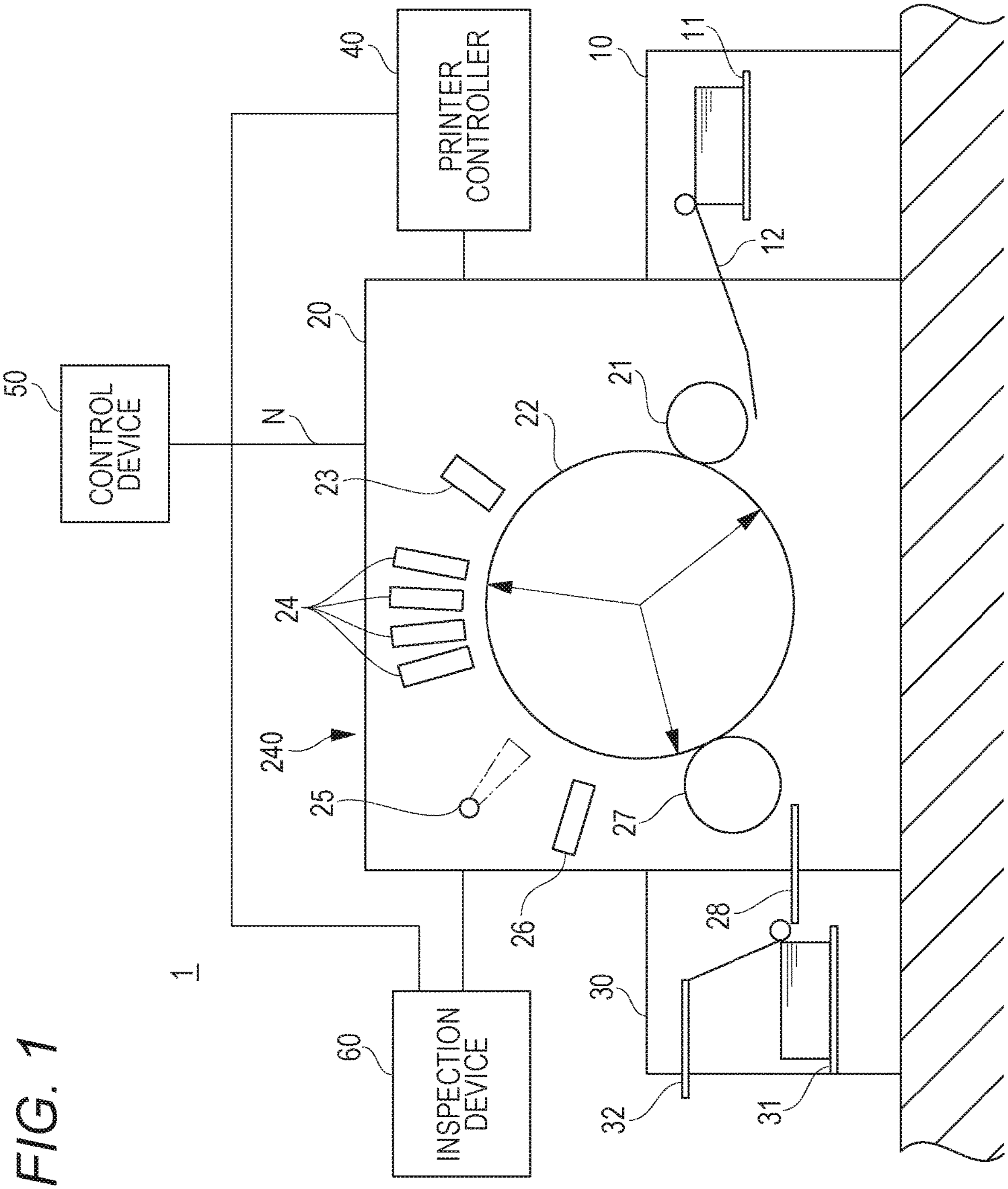
FIG. 1 is a schematic view illustrating an overall configuration of an image forming system according to a first embodiment of the present invention.

FIG. 1 is a schematic view illustrating an overall configuration of an image forming system 1. Note that FIG. 1 illustrates elements and related elements necessary for describing the present invention, and the image forming system of the present invention is not limited to the example illustrated in FIG. 1.

The image forming system 1 includes a sheet feed device 10, an image forming apparatus 20, a sheet ejection device 30, a printer controller 40, a control device 50, and an inspection device 60. These devices included in the image forming system 1 are communicably connected to each other via a network N such as a local area network (LAN).

The sheet feed device 10 includes a plurality of sheet feed trays 11 in which sheets (an example of a printing medium) of various paper types and sheet sizes are stored, and a sheet feed and conveyance section 12.

The image forming apparatus 20 is an image forming apparatus that forms an image on a sheet with an inkjet method, and is an example of a single pass ultra violet (UV) inkjet printer. The image forming apparatus 20 forms (hereinafter, also referred to as prints) an image on the surface of a sheet based on a print job input from the printer controller 40. When data for an abnormal nozzle detection chart is transmitted from the printer controller 40, the image forming apparatus 20 forms an image of the abnormal nozzle detection chart on the surface of a sheet. The image forming apparatus 20 includes a sheet feed cylinder 21 and a sheet ejection cylinder 27 that convey a sheet, an image forming drum 22 that carries the sheet, a heater 23 that heats the sheet conveyed around the outer circumference of the image forming drum 22, four head units 24, a fixer 25 that fixes the image onto the sheet, a read image generator 26 that may comprise a scanner and reads and acquires the image fixed onto the sheet, and the like.

The sheet feed device 10 feeds a sheet stored in the sheet feed trays 11, via the sheet feed and conveyance section 12, to the sheet feed cylinder 21 of the image forming apparatus 20.

The sheet feed cylinder 21 conveys the sheet to the image forming drum 22 of the image forming apparatus 20. Thereafter, the sheet ejection cylinder 27 of the image forming apparatus 20 receives the sheet on which an image has been formed after being conveyed to the image forming drum 22. The sheet ejection cylinder 27 conveys the received sheet, via a sheet ejection and conveyance section 28, to a sheet ejection tray 31 of the sheet ejection device 30.

The printer controller 40 performs raster image processor (RIP) processing on drawing data included in a print job transmitted from a terminal device (not illustrated) to generate image data. When the drawing data is data for the abnormal nozzle detection chart, the printer controller 40 generates the image data corresponding to the data for the abnormal nozzle detection chart. Then, the printer controller 40 transmits the generated image data to the image forming apparatus 20.

The control device 50 controls operations of the image forming apparatus 20, the sheet ejection device 30, the printer controller 40, and the inspection device 60. The details of the operation of each device will be described below.

The sheet ejection device 30 includes a sheet ejection tray 31 and a purge tray 32. A sheet on which an image is normally formed is ejected to the sheet ejection tray 31. A sheet having an image that fails to be normally formed and is identified as an abnormal image, or a sheet on which an abnormal nozzle detection chart is printed is ejected to the purge tray 32.

<Configuration of Image Former of Image Forming Apparatus>

Next, a configuration example of an image former (or image forming device) 240 of the image forming apparatus 20 according to the present embodiment will be described.

The image former 240 of the image forming apparatus 20 ejects (emits) ink droplets from a plurality of nozzles provided in recording heads 242 (see FIG. 2) of each head unit 24 to form an image on a sheet. The image former 240 forms the image on the sheet by superimposing four-color inks of yellow (Y), magenta (M), cyan (C), and black (K), for example. Note that the types of colors used for the image former 240 are not limited to the four types of Y, M, C, and K, and other colors may be used. In addition, the ink ejected from the nozzles according to the present embodiment is UV ink, which is cured by being irradiated with ultraviolet light.

The image forming drum 22 is formed in a cylindrical shape, and is rotationally driven by a drive motor (not illustrated), thereby rotating counterclockwise. A sheet fed from the sheet feed device 10 is carried on the outer circumferential surface of the image forming drum 22. Then, the image forming drum 22 conveys the sheet by rotating in a state of carrying the sheet. Each of the heater 23, the head units 24, the fixer 25, and the read image generator 26 is disposed to face the outer circumferential surface of the image forming drum 22.

The heater 23 includes, for example, a heating wire or the like, to generate heat when energized. Under the control by a controller (or computer) 200 (see FIG. 5), the heater 23 heats a sheet passing in the vicinity of the heater 23 while being carried by the image forming drum 22 to a predetermined temperature.

The head units 24 are provided on the downstream side in the sheet conveyance direction with respect to the heater 23.

The four head units 24 corresponding to each of the colors of yellow (Y), magenta (M), cyan (C), and black (K) are provided. The four head units 24 are arranged in the order of yellow, magenta, cyan, and black from the upstream side in the sheet conveyance direction.

The head units 24 are a recording section that ejects ink droplets from each of the plurality of nozzles of the plurality of recording heads 242 (see FIG. 2) to form an image on the sheet. The length of the head units 24 is set to a length covering the entire sheet (the page width) in a direction orthogonal to the sheet conveyance direction (the sheet width direction). That is, the image forming apparatus 20 according to the present embodiment is a line head type inkjet recording apparatus with a single pass method that forms an image by causing the head units 24 to scan the sheet only once. The four head units 24 have the same configuration except that the colors of the ink to be ejected are different from each other. Details of the head units 24 will be described below with reference to FIG. 2.

The fixer 25 is arranged on the downstream side in the sheet conveyance direction with respect to the four head units 24. As the fixer 25, for example, a fluorescent tube, which emits ultraviolet light, such as a UV lamp or a low-pressure mercury lamp, or the like is applied. Then, the fixer 25 emits ultraviolet light toward the sheet conveyed by the image forming drum 22 to cure the ink droplets ejected onto the sheet. Accordingly, the fixer 25 fixes an image formed on the sheet.

The read image generator 26 generates a read image from the image on the sheet. Thus, the read image generator 26 optically reads the entire page of the sheet on which the image is formed. The read image generator 26 transmits, to the inspection device 60, the read image acquired by reading by the read image generator 26.

[Configuration Example of Head Unit]

Next, a configuration example of the head unit 24 of the image forming apparatus 20 will be described with reference to FIG. 2.

Figure 2:
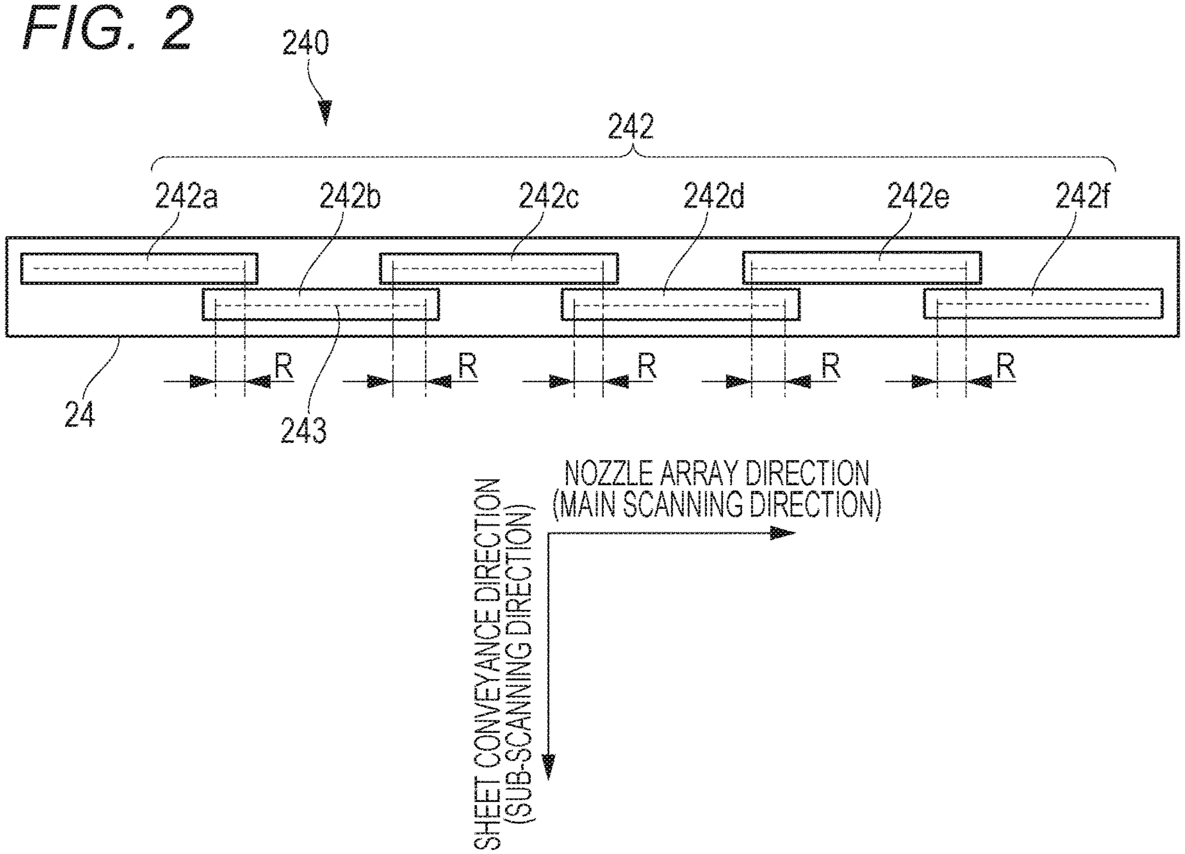
FIG. 2 is a plan view illustrating a head unit in a state of being viewed from the sheet side according to the first embodiment of the present invention.

FIG. 2 is a plan view illustrating the head unit 24 in a state of being viewed from the sheet side.

The head unit 24 includes a plurality of recording heads 242*a* to 242*f*. Note that in the following description, the recording heads 242*a* to 242*f* will be collectively referred to as the recording heads 242 in a case where it is not necessary to distinguish the recording heads 242*a* to 242*f* from each other.

FIG. 2 schematically illustrates the positions of the nozzles of the recording heads 242. The nozzles are arranged in a direction (in the present embodiment, the main scanning direction: the direction indicated by the arrow pointing to the right in the drawing) that intersects the sheet conveyance direction (the sheet conveyance direction: the direction indicated by the arrow pointing downward in the drawing). The arrangement direction of the nozzles is referred to as a nozzle array direction. The six recording heads 242*a* to 242*f* are arranged in a staggered manner such that their arrangement ranges in the nozzle array direction partially overlap each other. Then, the nozzles of the recording heads 242*a*, 242*c*, and 242*e* arranged at the odd-numbered positions along the nozzle array direction are positioned collinearly in the nozzle array direction, and the nozzles of the recording heads 242*b*, 242*d*, and 242*f* arranged at the even-numbered positions are positioned collinearly in the nozzle array direction.

In addition, the six recording heads 242*a* to 242*f* are arranged in the nozzle array direction being offset to each other with a positional relationship in which, among the plurality of nozzles (nozzle groups) provided in each of a pair of the recording heads 242 adjacent to each other, the arrangement range of the nozzles in the vicinity of the end portion on one side of one recording head 242 and the arrangement range of the nozzles in the vicinity of the end portion on the other side of the other recording head 242 overlap in the nozzle array direction.

In other words, the six recording heads 242*a* to 242*f* are arranged with a positional relationship in which their arrangement ranges in the nozzle array direction of the nozzle groups provided in each of the recording heads 242*a* to 242*f* include ranges different from each other to continuously connect ranges to which ink can be ejected in the nozzle array direction. An overlapping range R (joint) is set in each range in the nozzle array direction in which the nozzle groups of the recording heads 242*a* to 242*f* are arranged to overlap each other. In each overlapping range R, ink is complementarily ejected from each of the nozzles of the pair of recording heads 242 in which their nozzles are provided in the overlapping range R. In the present embodiment, the entire range in the nozzle array direction in which the nozzle groups of the pair of recording heads 242 are arranged to overlap each other is set to the overlapping range R.

Note that the number and arrangement of the recording heads 242 are not limited to the above-described example, and a configuration in which five or less or seven or more recording heads 242 are arranged may be adopted.

In addition, each recording head 242 is an inkjet head including a plurality of recording elements that includes the nozzles that ejects ink droplets toward a sheet. The recording elements include, in addition to the nozzles, a pressure chamber for storing ink and a piezoelectric element (not illustrated) provided on the side wall of the pressure chamber, and the nozzles communicate with the pressure chamber. As a driving condition, a drive voltage for deforming the piezoelectric elements is supplied from a head driver 241 (see FIG. 5) to the recording head 242 based on the pixel value of image data.

Due to the deformation of the piezoelectric element, the pressure chamber is deformed based on the drive voltage from the head driver 241, and the pressure in the pressure chamber changes accordingly. This change causes the operation of ejecting ink droplets from the nozzles communicating with the pressure chamber. Accordingly, in each recording head 242, ink droplets having the liquid amount corresponding to the pixel value of the image data are ejected from the plurality of nozzles toward the sheet to form the image on the sheet carried by the image forming drum 22.

<Configuration of In-Line Sensor>

Next, a configuration of an in-line sensor 261 used as an example of the read image generator 26 will be described with reference to FIG. 3.

Figure 3:
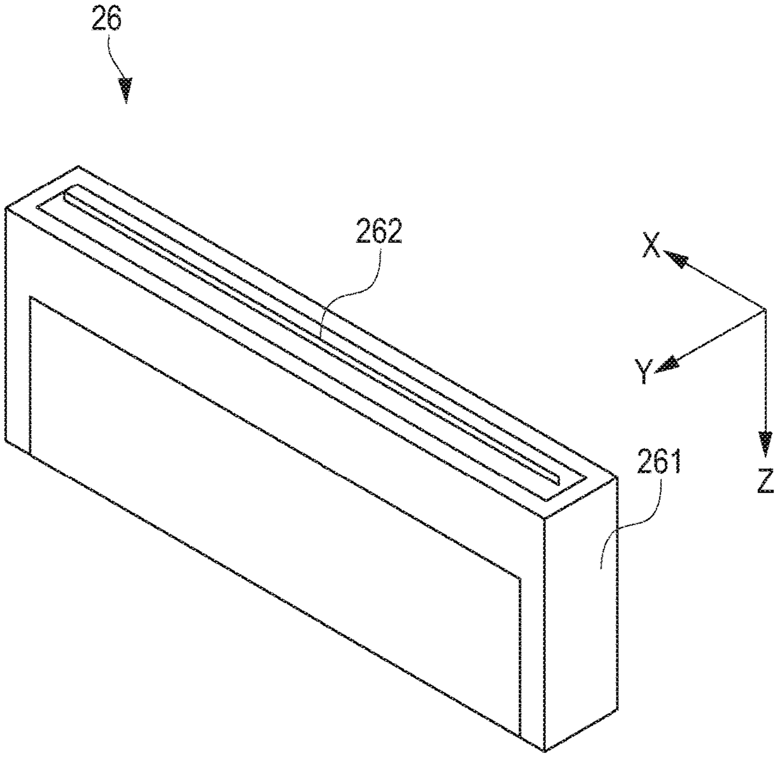
FIG. 3 is a perspective view illustrating a configuration example of an in-line sensor according to the first embodiment of the present invention.

FIG. 3 is a perspective view illustrating a configuration example of the in-line sensor 261.

FIG. 3 illustrates a configuration of the in-line sensor 261 in a state in which an image reading surface 262 of the in-line sensor 261 is arranged on the upper side in the Z direction. In the drawing, “X” represents the sheet width direction (main scanning direction), “Y” represents the sheet conveyance direction (sub-scanning direction), and “Z” represents the vertical direction. The surface of the image reading surface 262 of the in-line sensor 261 is covered with glass, and a line camera (in-line sensor) including a charge coupled device image sensor (CCD), a complementary metal oxide semiconductor image sensor (CMOS), or the like is provided below the glass in the Z direction.

The in-line sensor 261 is, for example, a line sensor in which a plurality of detection elements is arranged in the sheet width direction (main scanning direction). The in-line sensor 261 can acquire an image formed on a sheet for each of a plurality of wavelength components, for example, at three wavelengths of red (R), green (G), and blue (B). The length of the image reading surface 262 in the X direction is set to be longer than the maximum width assumed as the sheet width. This enables the in-line sensor 261 to read information on the sheet in the main scanning direction at a time without scanning in the main scanning direction. When reading the entire surface of one page of the sheet on which the image such as the abnormal nozzle detection chart is formed, the in-line sensor 261 outputs the read image to the inspection device 60.

<Functional Configuration of Image Forming System>

Next, a functional configuration of the image forming system 1 will be described with reference to FIG. 4.

Figure 4:
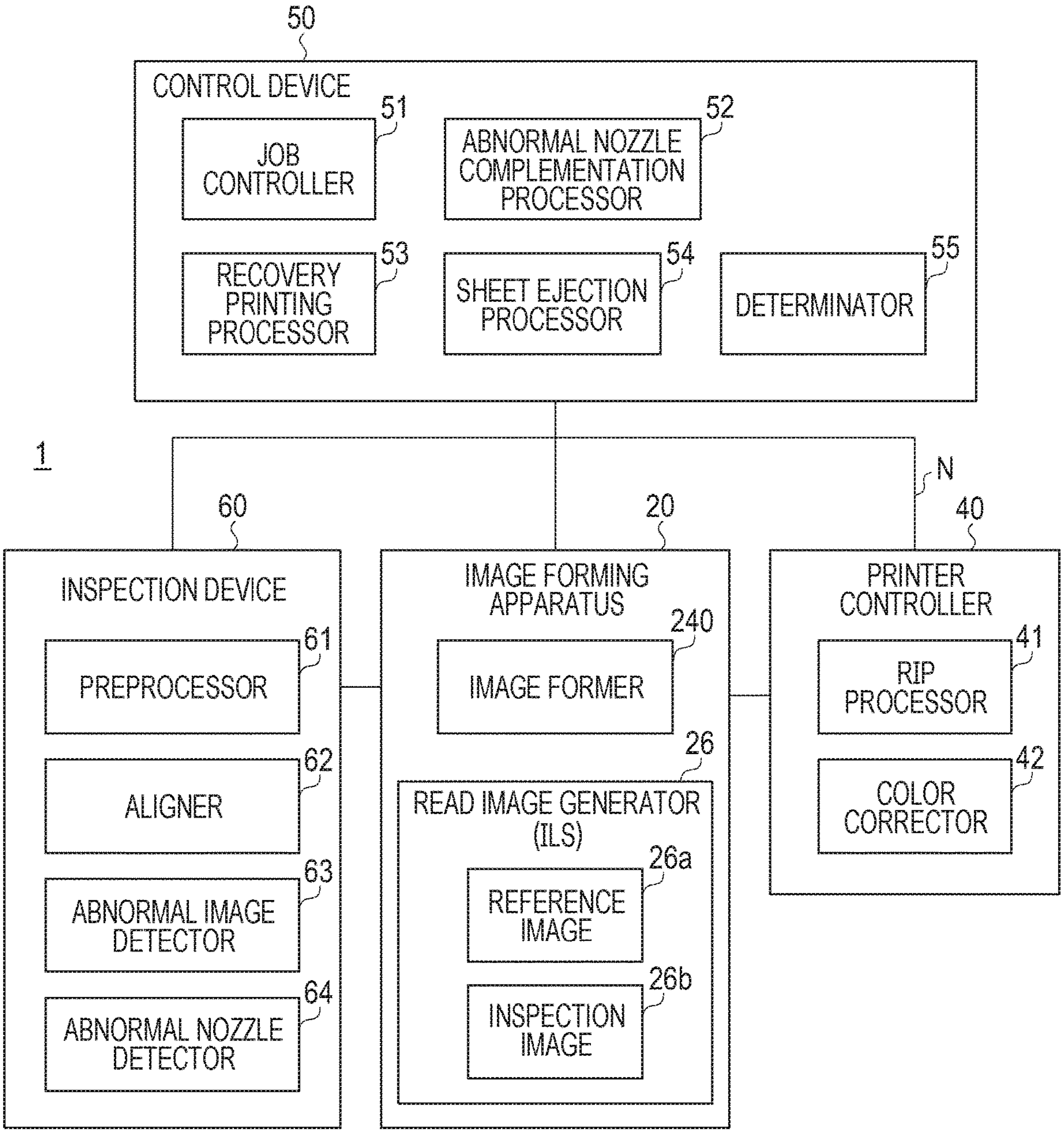
FIG. 4 is a block diagram illustrating a functional configuration example of the image forming system according to the first embodiment of the present invention.

FIG. 4 is a block diagram illustrating a functional configuration example of the image forming system 1.

(Configuration of Control Device)

The control device 50 includes a job controller 51, an abnormal nozzle complementation processor 52, a recovery printing processor 53, a sheet ejection processor 54, and a determinator 55.

The job controller 51 controls jobs including various settings such as the execution order of jobs for causing the image forming apparatus 20 to perform printing and the type of sheet. As an image to be printed by the image forming apparatus 20, an image of the abnormal nozzle detection chart to be printed when an abnormality is detected in a printed image is included in addition to the normal image as described above.

The abnormal nozzle complementation processor 52 performs an abnormal nozzle complementation processing of complementing the abnormal nozzle detected by an abnormal nozzle detector 64 included in the inspection device 60. Then, the abnormal nozzle complementation processor 52 allocates ink to be ejected based on image data from the nozzle detected as the abnormal nozzle to the nozzle adjacent to the abnormal nozzle. For example, the abnormal nozzle complementation processor 52 outputs, to the image former 240, control data for allocating ink to be ejected based on the image data from the nozzle detected as the abnormal nozzle to the nozzle adjacent to the abnormal nozzle, thereby complementing the abnormal nozzle for the image former 240. A streak generated in an image formed on a sheet by the image forming apparatus 20, which is due to the ejection failure of the head, is typically an omission streak in which colors are omitted from the periphery of the head. The abnormal nozzle complementation processing is, for example, processing of increasing the ink ejection amount of the nozzle around the abnormal nozzle in the recording heads 242 to prevent from occurring the streak (see FIG. 2). In addition, the abnormal nozzle complementation processing includes the inclination adjustment of the head, the overlapping adjustment of the nozzles, the voltage adjustment for adjusting the ink ejection amount, and the like.

The recovery printing processor 53 causes the image forming apparatus 20 on which the abnormal nozzle complementation processing has been performed to perform recovery printing of the image. Thus, after the abnormal nozzle complementation processing is performed, the image forming processing of forming the image on the sheet by the image former 240 is restarted. The head cleaning of the nozzle has been conventionally required before the recovery printing, but in the present embodiment, the head cleaning of the nozzle is not performed before the recovery printing. This enables the image forming apparatus 20 to immediately perform the recovery printing without performing the head cleaning.

The sheet ejection processor 54 instructs to eject a sheet on which an image has been formed. In a case where the image formed on the sheet is a normal image, the sheet ejection processor 54 instructs to eject the sheet to the sheet ejection tray 31 of the sheet ejection device 30. On the other hand, in a case where the image formed on the sheet is an abnormal image or the image of the abnormal nozzle detection chart recovery-printed after the abnormal nozzle complementation processing, the sheet ejection processor 54 instructs to eject the sheet to the purge tray 32 of the sheet ejection device 30. Consequently, it becomes easier for an operator to take out the sheet ejected to the purge tray 32 to check the sheet on which an abnormal image is formed or the sheet on which an abnormal nozzle detection chart is formed.

Figure 10:
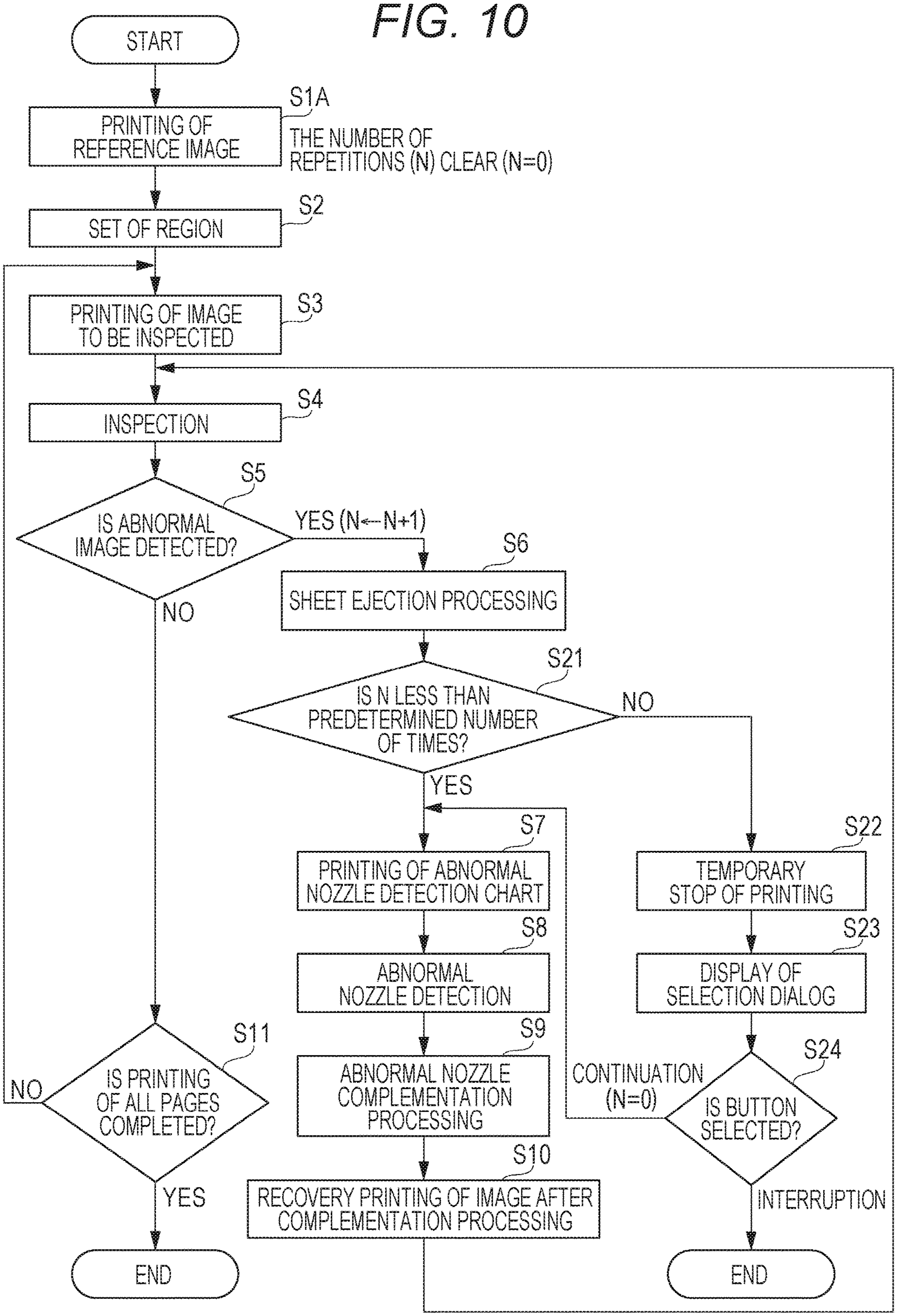
FIG. 10 is a flowchart illustrating an example of processing in which the temporary stop is performed at the time of the recovery printing after detection of the abnormal image according to the first embodiment of the present invention.

The determinator 55 acquires, from an abnormal image detector 63, information indicating that inspection processing has been performed and the number of times an abnormal image has been detected. Then, the determinator 55 determines whether or not the number of times an abnormal image has been detected through the inspection processing re-performed by the abnormal image detector 63 exceeds a predetermined number of times. Here, the number of times an abnormal image has been detected is counted as N times as illustrated in FIG. 10 described below. Then, the determinator 55 determines whether or not the counted N times (N is an integer equal to or greater than 0) is less than the predetermined number of times. In a case of determining that the number of times an abnormal image has been detected exceeds the predetermined number of times, the determinator 55 causes the image forming apparatus 20 to temporarily stop the image forming processing. Note that the predetermined number of times can be set by a user. Thus, it is possible to set the predetermined number of times to be more (for example, five times) in a case of an image including only characters, and set the predetermined number of times to be less (for example, two times) in a case of an image including a photograph and the like.

Then, after temporarily stopping the image formation processing, the determinator 55 displays a selector on a display 530 (see FIG. 7 described below) for a user to select whether to perform the image forming processing again or to interrupt the image forming processing. The selector is displayed, for example, as a selection dialog in FIG. 11 described below.

(Configuration of Printer Controller)

The printer controller 40 includes a RIP processor 41 and a color corrector 42.

The RIP processor 41 performs RIP processing on drawing data included in a print job transmitted from a terminal device (not illustrated) to generate image data such as print data in a raster format.

The color corrector 42 performs color correction of the image data converted into a raster format by the RIP processor 41. Then, the image data on which the color correction has been performed by the color corrector 42 is transmitted to the image forming apparatus 20 to be used for the image formation.

(Configuration of Image Forming Apparatus)

The image forming apparatus 20 includes the image former 240, the read image generator 26, and the like.

The overview of the processing of the image former 240 is as described above.

The read image generator 26 reads an image first printed on a sheet by the image forming apparatus 20, and then sets the first read image as a reference image **26*a*. As described above, the reference image 26*a* is the read image acquired by reading, by the read image generator 26, the image first formed on the sheet based on a job executed in the image former 240. As the reference image 26*a*, image data transferred to the image former 240** may be used.

After forming the image used as the reference image **26*a* on the sheet, the image former 240 temporarily stops the image forming processing of forming the image on the sheet. Since the image forming processing is temporarily stopped, a user can visually check the sheet on which the image used as the reference image 26*a* is formed. Note that after the image used as the reference image 26***a* is formed on the sheet and the image forming processing is temporarily stopped, the read image may be displayed on the display 530 (see FIG. 7). In this case, the user can also visually check the image used as the reference image 26*a* through the control device 50 located away from the image forming apparatus 20.

Further, the read image generator 26 reads the image printed on each sheet of the subsequent pages by the image former 240 and then set the read image as inspection image 26*b*. The reference image 26*a* and the inspection image 26*b* are sent together to the inspection device 60 to be inspected by the inspection device 60.

(Configuration of Inspection Device)

The inspection device 60 includes a preprocessor 61, an aligner 62, the abnormal image detector 63, and the abnormal nozzle detector 64, which are implemented as functions of a controller (or computer) 600 described later.

The preprocessor 61 performs preprocessing on the inspection image 26*b* received from the image forming apparatus 20. The preprocessing includes, for example, resolution conversion and size conversion of the inspection image 26*b*. The resolution conversion processing is performed to increase the speed of comparison between the inspection image 26*b* and the reference image 26*a* by lowering the resolution of the inspection image 26*b*. The size conversion processing is performed by enlarging or reducing the size of an image when the sizes of images formed on the sheet change between the front surface and the back surface of the sheet, for example.

In a case where image data to be transferred to the image former 240 is used as the reference image 26*a*, the preprocessor 61 performs image processing on the image data. The image processing includes at least one of resolution conversion and color conversion. The resolution conversion is, for example, processing of converting the image data of 560 dpi that is read with the resolution of the in-line sensor 261 into 200 dpi. In addition, the color conversion is processing for color matching and is, for example, processing of converting YMCK image data after the RIP processing into RGB image data that can be compared with the inspection image 26*b*.

The aligner 62 aligns the reference image 26*a* with the inspection image 26*b* after the preprocessing.

The abnormal image detector 63 detects an abnormal image from the inspection image 26*b*, which is the read image of an image to be inspected. For example, the abnormal image detector 63 compares, using, as the reference image 26*a*, a read image serving as a reference for comparison among the read images, the reference image 26*a* on which the alignment has been performed with the inspection image 26*b* to extract a difference, and thus detects the abnormal image. In a case of determining that the inspection image 26*b* is different from the reference image 26*a*, the abnormal image detector 63 detects the inspection image 26*b* as the abnormal image. As the abnormal image, for example, an image in which a formation defect such as a streak or an omission occurs in the inspection image 26*b* is assumed.

Further, the abnormal image detector 63 outputs information indicating that an abnormal image has been detected to the control device 50. Upon receiving the information indicating that the abnormal image has been detected, the job controller 51 of the control device 50 outputs, to the printer controller 40, the job for printing the image of the abnormal nozzle detection chart on a sheet. The printer controller 40 outputs, to the image forming apparatus 20, the image data on which the above-described RIP processing and the color correction have been performed, and the image forming apparatus 20 prints the image of the abnormal nozzle detection chart on the sheet. Upon reading of the image of the abnormal nozzle detection chart by the read image generator 26, the read image of the abnormal nozzle detection chart is sent to the abnormal nozzle detector 64.

Note that in a case where the image forming apparatus 20 holds the image of the abnormal nozzle detection chart in advance, the image forming apparatus 20 may print the image of the abnormal nozzle detection chart on a sheet immediately after the abnormal image is detected by the abnormal image detector 63. In this case, since the processing of the printer controller 40 is not performed, it is possible to shorten the time until the image of the abnormal nozzle detection chart is printed on a sheet.

After detection of the abnormal image by the abnormal image detector 63, the abnormal nozzle detector 64 detects, as the abnormal nozzle, the nozzle in which an abnormality occurs based on the read image of the sheet on which the abnormal nozzle detection chart (an example of the abnormal nozzle detection image) is formed by the image former 240.

For example, in a case of the inspection image 26*b* in which a streak occurs as the abnormal image, the ink ejection from a nozzle that is supposed to eject the ink cannot be confirmed, so that the ejection failure is occurring in the head.

The abnormal nozzle detector 64, hence detects the nozzle that is supposed to eject the ink to the position where the streak occurs as the abnormal nozzle in which the ejection failure has occurred based on the read image of the abnormal nozzle detection chart. Information on the abnormal nozzle detected by the abnormal nozzle detector 64 is output to the control device 50. The control device 50 causes the above-described abnormal nozzle complementation processor 52 to perform the abnormal nozzle complementation processing based on the information on the abnormal nozzle.

<Configuration of Control System of Image Forming Apparatus>

Figure 5:
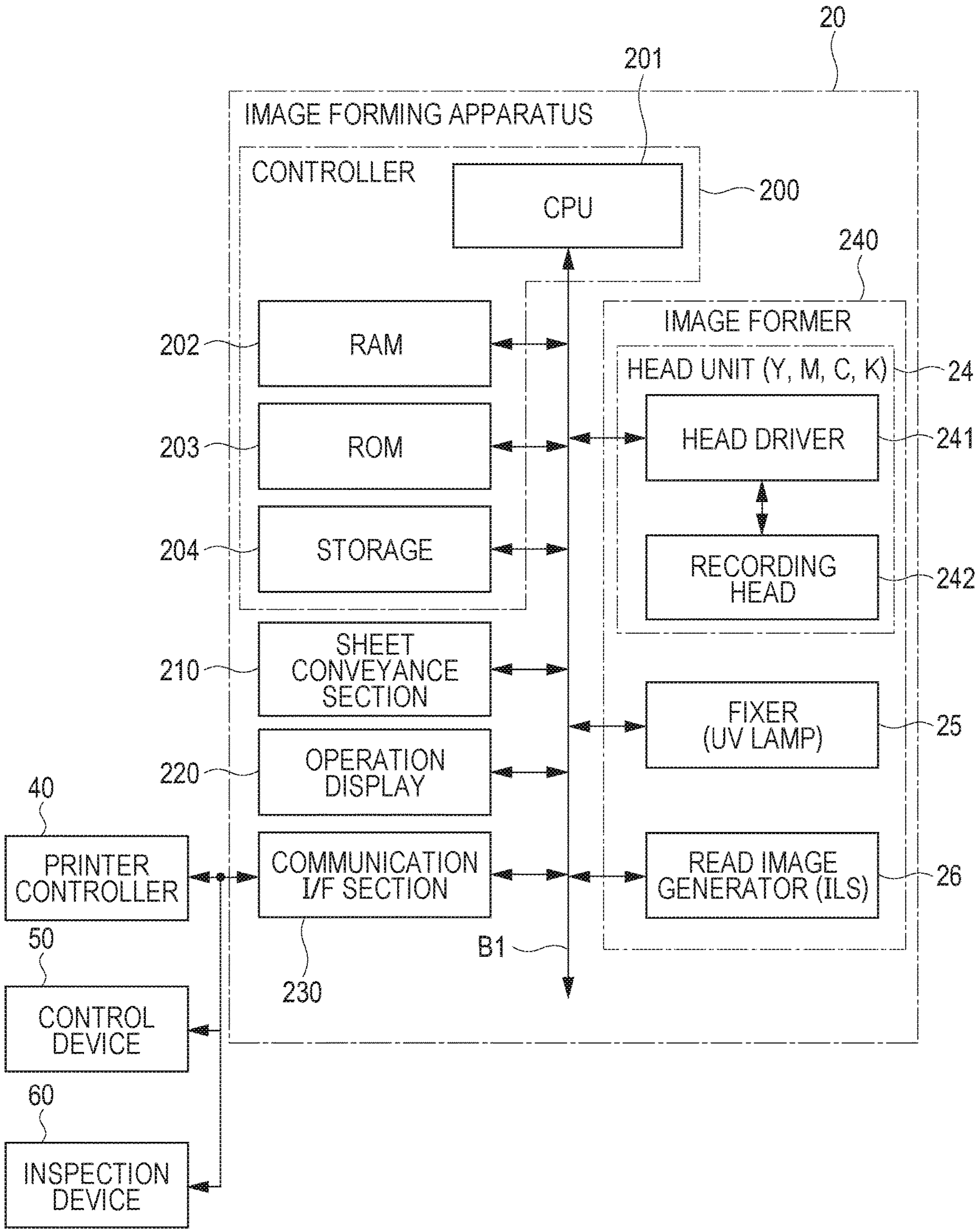
FIG. 5 is a block diagram illustrating a configuration example of a control system of an image forming apparatus according to the first embodiment of the present invention.

Next, a configuration of a control system of the image forming apparatus 20 will be described with reference to FIG. 5. FIG. 5 is a block diagram illustrating a configuration example of the control system of the image forming apparatus 20.

As illustrated in FIG. 5, the image forming apparatus 20 includes the controller 200. The controller 200 includes, for example, a central processing unit (CPU) 201, a random access memory (RAM) 202 used as a work area for the CPU 201, a read only memory (ROM) 203 for storing a program and the like to be executed by the CPU 201, and the like.

The CPU 201 of the controller 200 is connected to each section included in the image forming apparatus 20 via a system bus B1 to control the operation of each section.

In addition, the controller 200 includes a storage 204 as a large-capacity storage device constituted by a hard disc drive (HDD), a solid state drive (SSD), or the like. The storage 204 stores therein image date received from the printer controller 40, date relating to the ejection amount of ink droplets from the nozzle group in the plurality of recording heads 242 (ink ejection amount date), and the like.

The image forming apparatus 20 further includes a sheet conveyance section 210, an operation display 220, a communication interface (I/F) 230, the image former 240, and the like.

The sheet conveyance section 210 conveys the sheet by driving the mechanism of the conveyance system such as the sheet feed cylinder 21, the sheet ejection cylinder 27, and the like for passing and receiving the sheet to and from the image forming drum 22.

The operation display 220 includes, for example, a touch screen, which combines a panel type display device (an example of a notification section) such as a liquid crystal display (LCD) or an organic electro luminescence (EL) display device, and a position input device such as a touch pad. The operation display 220 displays an instruction menu for the user, information on the acquired image data, and the like. On the display device of the operation display 220, for example, a notification (notice) of an abnormality when the control device 50 detects the occurrence of the nozzle abnormality from the read image acquired by the read image generator 26 or the like is displayed.

The communication I/F section 230 is connected to the printer controller 40. Then, the communication I/F section 230 receives image date from the printer controller 40 to supply the received image date to the controller 200 via the system bus B1.

The image former 240 forms an image on the surface of the sheet based on the image data transmitted from the printer controller 40. When the data for the abnormal nozzle detection chart is transmitted from the printer controller 40, the image of the abnormal nozzle detection chart is formed on the surface of the sheet. The head driver 241 in each head unit 24 drives the recording heads 242. The other components included in the image former 240 have been described with reference to FIG. 2, and thus description thereof is omitted here.

<Configuration of Control System of Printer Controller>

Figure 6:
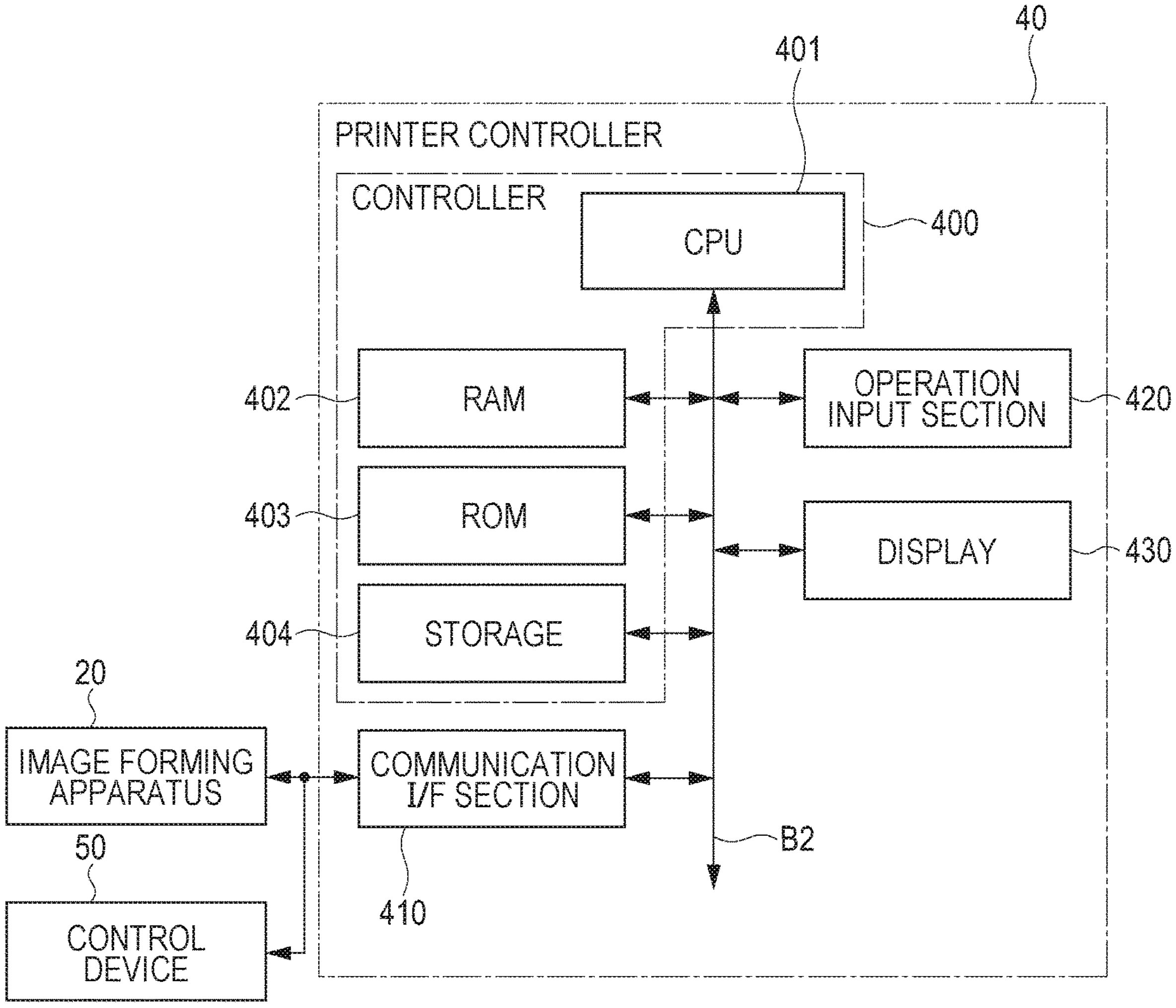
FIG. 6 is a block diagram illustrating a configuration example of a control system of a printer controller according to the first embodiment of the present invention.

Next, a configuration of a control system of the printer controller 40 will be described with reference to FIG. 6. FIG. 6 is a block diagram illustrating a configuration example of the control system of the printer controller 40.

As illustrated in FIG. 6, the printer controller 40 includes a controller (or computer) 400. The controller 400 includes, for example, a CPU 401, a RAM 402 used as a work area of the CPU 401, a ROM 403 for storing a program and the like to be executed by the CPU 401, and the like.

The CPU 401 of the controller 400 is connected to each section included in the printer controller 40 via a system bus B2 to control the operation of each section.

The controller 400 further includes a storage 404 as a large-capacity storage device constituted by an HDD, an SSD, or the like. The storage 404 stores therein image data transmitted to the image forming apparatus 20 and the like.

The functions of the functional sections of the printer controller 40 illustrated in FIG. 4 are implemented by the CPU 401, the RAM 402, the ROM 403, and the storage 404 in the controller 400.

The printer controller 40 further includes a communication I/F section 410, an operation input section 420, a display 430, and the like.

The communication I/F section 410 is connected to the image forming apparatus 20 to transmit, to the image forming apparatus 20, image data in a raster format generated by the RIP processor 41 illustrated in FIG. 4 and the like. The communication I/F section 410 is also connected to the control device 50 to receive, from the control device 50, data of various instructions for printing and the like in addition to image data for printing and image data of the abnormal nozzle detection chart.

The operation input section 420 includes, for example, a keyboard and a mouse, serving as an input section for receiving data input, such as various instructions, characters and numerals through user operations.

The display 430, which is a panel type display device such as a liquid crystal display or an organic EL display device, displays an instruction menu for the user, information on the acquired image data, and the like.

<Configuration of Control System of Control Device>

Figure 7:
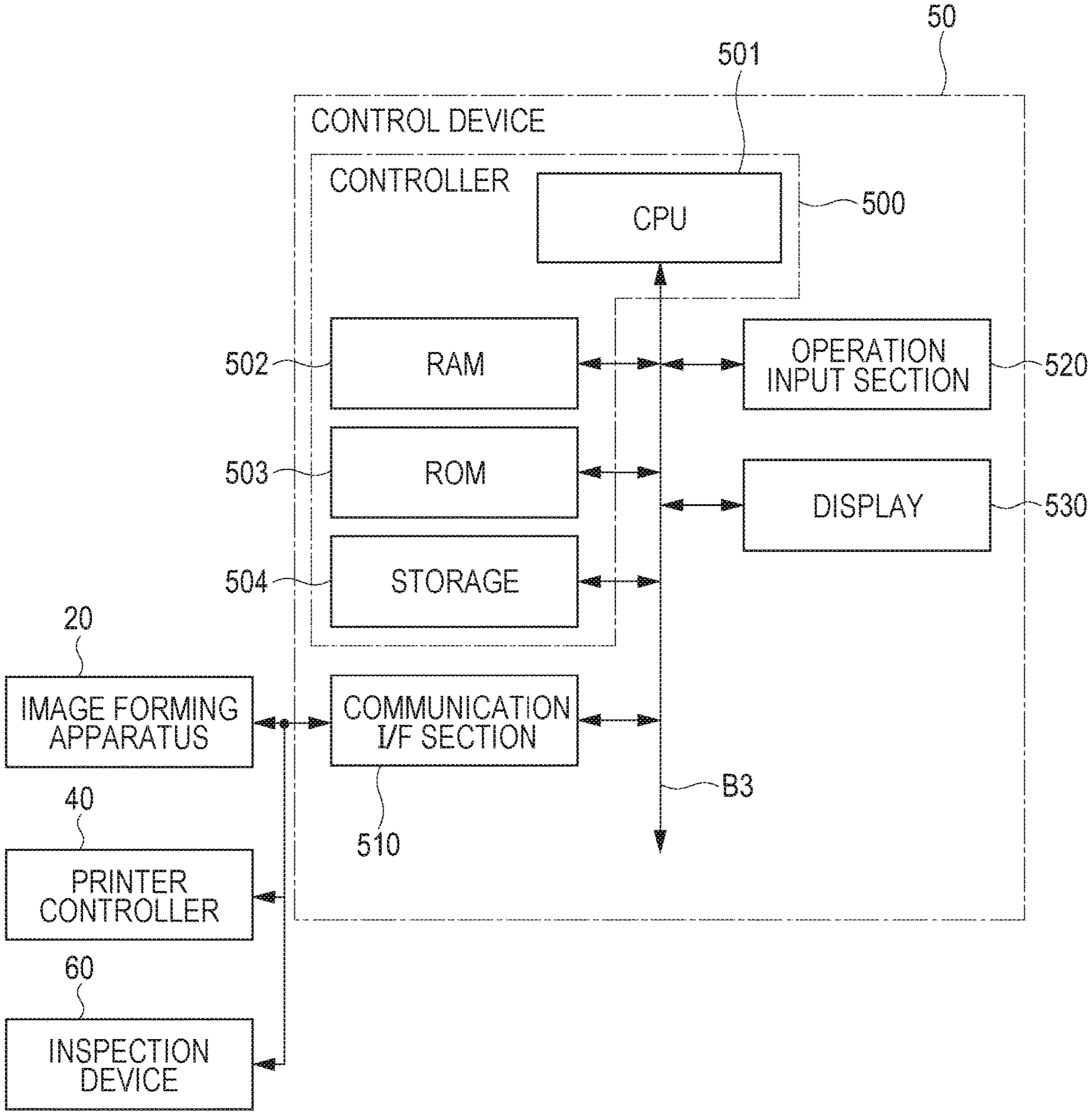
FIG. 7 is a block diagram illustrating a configuration example of a control system of a control device according to the first embodiment of the present invention.

Next, a configuration of a control system of the control device 50 will be described with reference to FIG. 7. FIG. 7 is a block diagram illustrating a configuration example of the control system of the control device 50.

As illustrated in FIG. 7, the control device 50 includes a controller (or computer) 500. The controller 500 includes, for example, a CPU 501, a RAM 502 used as a work area of the CPU 501, a ROM 503 for storing a program and the like to be executed by the CPU 501, and the like.

The CPU 501 of the controller 500 is connected to each section included in the control device 50 via a system bus B3 to control the operation of each section.

The CPU 501 performs controls of, for example, the following (1) to (4).

(1) Control for causing the printer controller 40 to perform the RIP processing on drawing data included in a print job.

(2) Control for causing the read image generator 26 of the image forming apparatus 20 to acquire an image of a sheet.

(3) Control for causing the inspection device 60 to inspect the image acquired by the read image generator 26.

(4) Control for complementing an abnormal nozzle of the image forming apparatus 20 to cause the image forming apparatus 20 to perform the recovery printing.

The CPU 501 performs the abnormal nozzle complementation processing, the recovery printing process, and the like described with reference to FIG. 4. The abnormal nozzle complementation processing is the processing of causing the image forming apparatus 20 to increase the ejection amount from the nozzle around the abnormal nozzle to complement a streak when the streak is detected in the inspection image 26*b*. In addition, the recovery printing processing is the processing of causing the image forming apparatus 20 to perform the recovery printing of an image in which the streak is detected after the abnormal nozzle complementation processing has been performed. In addition, the CPU 501 also performs control for displaying, on the display device of the operation display 220, the facts that the abnormal nozzle complementation processing has been performed and that the recovery printing processing has been performed due to occurrence of the abnormality in the inspection image 26*b* to notify the user of the occurrence of the abnormal image.

The controller 500 further includes a storage 504 as a large-capacity storage device constituted by an HDD, an SSD, or the like. The storage 504 stores therein, in addition to the image data for printing and the image data of the abnormal nozzle detection chart, a processing result of the image forming apparatus 20, a processing result of the printer controller 40, an inspection result received from the inspection device 60, and the like. The functions of the functional sections of the control device 50 illustrated in FIG. 4 are implemented by the CPU 501, the RAM 502, the ROM 503, and the storage 504 in the controller 500.

The control device 50 further includes a communication I/F section 510, an operation input section 520, and the display 530.

The communication I/F section 510 is connected to the image forming apparatus 20 to receive the read image of the sheet transmitted from the image forming apparatus 20. The communication I/F section 510 is also connected to the printer controller 40 to transmit, to the printer controller 40, the image data for printing, the image data of the abnormal nozzle detection chart, and the like, together with the job. The communication I/F section 510 is also connected to the inspection device 60 to receive the inspection result by the inspection device 60.

The operation input section 520 includes, for example, a keyboard and a mouse, serving as an input section for receiving data input, such as various instructions, characters and numerals through user operations.

The display 530, which is a panel type display device such as a liquid crystal display or an organic EL display device, displays an instruction menu for the user, information on the acquired image data, and the like.

<Configuration of Control System of Inspection Device>

Figure 8:
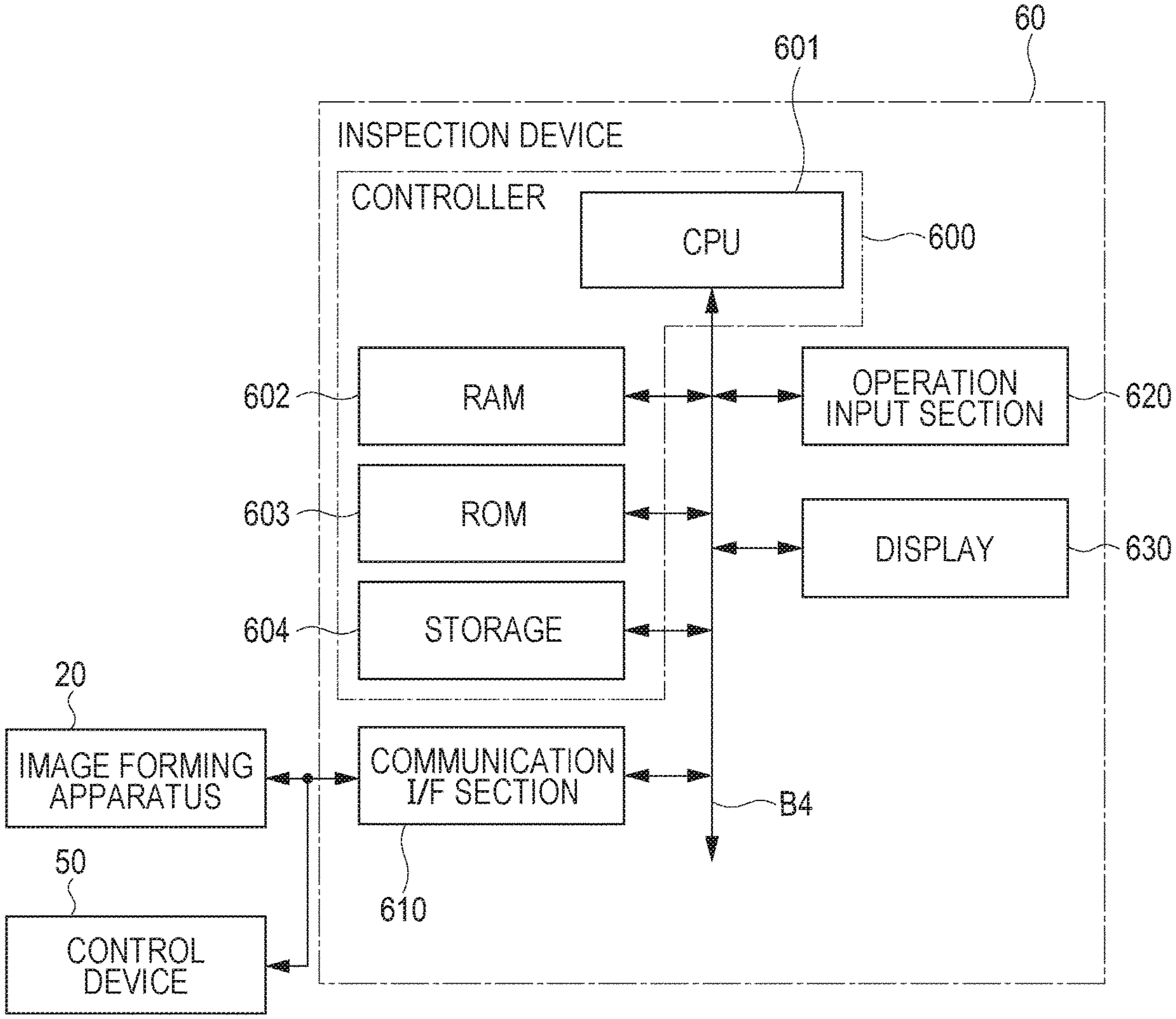
FIG. 8 is a block diagram illustrating a configuration example of a control system of an inspection device according to the first embodiment of the present invention.

Next, a configuration of a control system of the inspection device 60 will be described with reference to FIG. 8. FIG. 8 is a block diagram illustrating a configuration example of the control system of the inspection device 60.

As illustrated in FIG. 8, the inspection device 60 includes the controller 600. The controller 600 includes, for example, a CPU 601, a RAM 602 used as a work area of the CPU 601, a ROM 603 for storing a program and the like to be executed by the CPU 601, and the like.

The CPU 601 of the controller 600 is connected to each section included in the inspection device 60 via a system bus B4 to control the operation of each section.

The controller 600 further includes a storage 604 as a large-capacity storage device constituted by an HDD, an SSD, or the like. The storage 604 stores therein image data transmitted to the image forming apparatus 20 and the like.

The functions of the functional sections of the inspection device 60 illustrated in FIG. 4 are implemented by the CPU 601, the RAM 602, the ROM 603, and the storage 604 in the controller 600.

The inspection device 60 further includes a communication I/F section 610, an operation input section 620, a display 630, and the like.

The communication I/F section 610 is connected to the image forming apparatus 20 to receive, from the image forming apparatus 20, the reference image 26*a* and the inspection image 26*b*. The communication I/F section 610 is also connected to the control device 50 to transmit the inspection result and the like to the control device 50.

The operation input section 620 includes, for example, a keyboard and a mouse, serving as an input section for receiving data input, such as various instructions, characters and numerals through user operations.

The display 630, which is a panel type display device such as a liquid crystal display or an organic EL display device, displays an instruction menu for the user, information on the acquired image data, and the like.

<Example of Processing of Image Forming System>

Next, an example of processing of the image forming system 1 will be described with reference to FIGS. 9 to 11.

(Processing in which Temporary Stop is not Performed at the Time of Recovery Printing)

Figure 9:
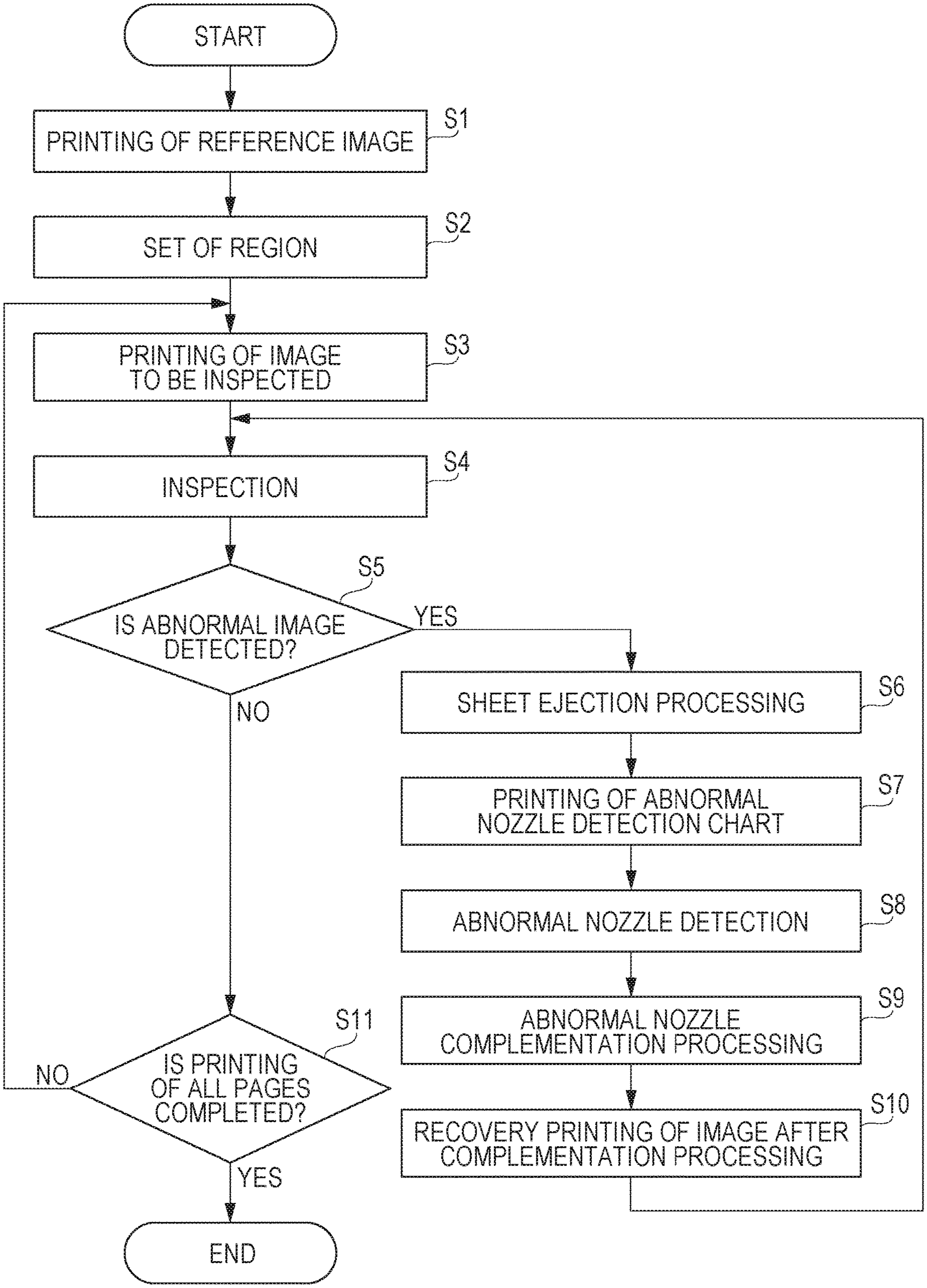
FIG. 9 is a flowchart illustrating an example of processing in which a temporary stop is not performed at the time of recovery printing after detection of the abnormal image according to the first embodiment of the present invention.

FIG. 9 is a flowchart illustrating an example of processing in which a temporary stop is not performed at the time of the recovery printing after detection of the abnormal image.

First, the job controller 51 of the control device 50 outputs, to the printer controller 40, image data of the first sheet serving as the reference image, and the printer controller 40 outputs, to the image forming apparatus 20, the image data in a raster format on which the RIP processing and the color correction have been performed. Then, the image former 240 of the image forming apparatus 20 prints the image of the first sheet on a sheet as the reference image, based on the image data in a raster format (S1). The image printed on the first sheet is read by the read image generator 26 to be generated as the reference image 26*a*. Then, the read image generator 26 outputs the reference image 26*a* to the inspection device 60.

The abnormal image detector 63 of the inspection device 60 sets a region in the reference image 26*a* where abnormalities are not detected (S2). For example, a region of which content changes for each printed pages, such as an address field in variable printing, is set. In addition, the abnormal image detector 63 may set the level of the abnormal image detection to be lower in the region where only characters are printed or set the level of the abnormal image detection to be higher in the region where photographs are printed.

Next, the image former 240 of the image forming apparatus 20 prints the second and subsequent images on sheets as images to be inspected based on the image data in a raster format (S3). Each of the second and subsequent images is generated as the inspection image 26*b* by the read image generator 26. Then, the read image generator 26 outputs the inspection image 26*b* to the inspection device 60.

Next, the abnormal image detector 63 inspects the inspection image 26*b* read from the sheet (S4). Between steps S3 and S4, the preprocessor 61 of the inspection device 60 performs the preprocessing on the inspection image 26*b*, and the aligner 62 aligns the position of the inspection image 26*b* with the position of the reference image 26*a*. Then, the abnormal image detector 63 compares the inspection image 26*b* with the reference image 26*a* to detect the inspection image 26*b* as an abnormal image when a difference occurs. Then, the abnormal image detector 63 determines whether or not an abnormal image has been detected (S5).

In a case of detecting no abnormal image (NO in S5), the abnormal image detector 63 outputs the detection result to the image forming apparatus 20 and the control device 50. The image former 240 of the image forming apparatus 20 determines whether or not printing of all pages is completed (S11). In a case where printing of all pages is not completed (NO in S11), the processing returns to step S3 and the printing of the inspection image and the inspection continue. On the other hand, in a case where the printing of all pages has been completed (YES in S11), the processing is terminated.

In a case of detecting an abnormal image in step S5 (YES in S5), the abnormal image detector 63 outputs the detection result to the image forming apparatus 20, the sheet ejection device 30, and the control device 50. The sheet ejection device 30 performs sheet ejection processing to eject the sheet on which the abnormal image is detected to the purge tray 32 (S6).

Next, upon acquiring the information indicating that the abnormal image has been detected from the abnormal image detector 63, the job controller 51 of the control device 50 outputs, to the printer controller 40, the instruction to print the image of the abnormal nozzle detection chart on a sheet. The printer controller 40 outputs, to the image former 240, the image of the abnormal nozzle detection chart stored in advance. Then, the image former 240 prints the image of the abnormal nozzle detection chart on the sheet (S7). Then, the read image generator 26 reads the image of the abnormal nozzle detection chart printed on the sheet to output the image as the inspection image 26*b* to the inspection device 60.

Next, the abnormal nozzle detector 64 of the inspection device 60 detects the abnormal nozzle based on the inspection image 26*b* of the abnormal nozzle detection chart (S8).

Then, the abnormal nozzle detector 64 transmits information on the detected abnormal nozzle to the control device 50.

The abnormal nozzle complementation processor 52 of the control device 50 performs the abnormal nozzle complementation processing based on the information on the abnormal nozzle (S9). Then, the recovery printing processor 53 transmits the control data on which the abnormal nozzle complementation processing has been performed to the image forming apparatus 20.

The image former 240 of the image forming apparatus 20 recovery-prints, on a sheet, the image after the complementation processing on which the abnormal nozzle complementation processing has been performed based on the control data received from the image forming apparatus 20 (S10). The image recovery-printed on the sheet is inspected again in step S4. That is, the abnormal image detector 63 re-performs the inspection processing for detecting the abnormal image using, as the inspection image 26*b*, the read image generated by the read image generator 26 from the image formed on the sheet through the image forming processing restarted after the processing of complementing the abnormal nozzle by the abnormal nozzle complementation processor 52.

Processing in which Temporary Stop is Performed at the Time of Recovery Printing)

Although the recovery printing is automatically performed in the processing illustrated in FIG. 9, when an abnormality that cannot be complemented by the abnormal nozzle complementation processing occurs, the abnormal image is detected in the inspection of step S5 no matter how many times the recovery printing is performed. For example, in a case where a plurality of adjacent nozzles is detected as the abnormal nozzles, filling a streak occurring in a wide range due to these abnormal nozzles may be failed by complementing with other nozzles. Then, as illustrated in FIG. 10, processing of temporarily stopping the recovery printing and prompting the user to continue or interrupt the printing may be performed.

FIG. 10 is a flowchart illustrating an example of processing in which the temporary stop is performed at the time of the recovery printing after detection of the abnormal image. Detailed descriptions for the same processing as that of FIG. 9 will be omitted.

First, the image former 240 of the image forming apparatus 20 prints the image of the first sheet on a sheet as the reference image, based on the image data in a raster format (S1A). Note that in step S1A, the number of repetitions (N) of the recovery printing counted in step S21 described below is cleared to "0".

Thereafter, in a case where an abnormal image is detected in step S5 (YES in step S5), the number of repetitions (N) is increased by "1". Then, after the sheet ejection processing is performed in step S6, the image former 240 determines whether or not the number of repetitions (N) of the recovery printing is less than a predetermined number of times (S21). In a case where the number of repetitions (N) of the recovery printing is less than the predetermined number of times (YES in S21), the processing in steps S7 to S10 is similarly performed to in FIG. 9.

On the other hand, in a case where the number of repetitions (N) of the recovery printing is equal to or more than the predetermined number of times (NO in S21), the image former 240 temporarily stops the printing (S22). The reason the printing is temporarily stopped is because the abnormal image has been continuously detected even when the recovery printing has been repeated through performing the abnormal nozzle complementation processing, and the normal image cannot be acquired only through the abnormal nozzle complementation processing. Then, the user considers head cleaning, head repair, or the like.

Figure 11:
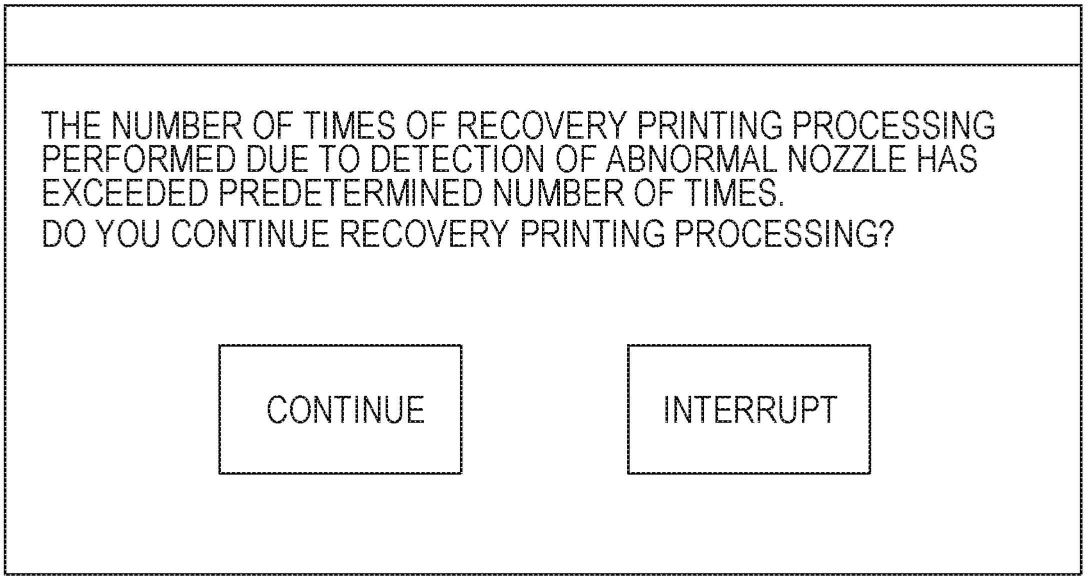
FIG. 11 is a view illustrating a display example of a selection dialog according to the first embodiment of the present invention.

Hence, the determinator 55 displays the selection dialog illustrated in FIG. 11 on the display 530 (see FIG. 7) (S23). Then, the determinator 55 determines which of the continuation button and the interruption button is selected by the user through the operation input section 520 (S24). Here, a display example of the selection dialog is described.

FIG. 11 is a view illustrating the display example of the selection dialog.

In the selection dialog, it is displayed that the number of times of the recovery printing processing performed due to detection of the abnormal nozzle has exceeded the predetermined number of times (the number of repetitions (N) of the recovery printing). Then, in the selection dialog, the continuation button for instructing the continuation of the recovery printing processing and an interruption button for instructing the interruption of the recovery printing processing are displayed. The operator can instruct the image former 240 to perform the processing by pressing the continuation button or the interruption button.

Returning to FIG. 10 again, the description continues.

In a case where the operator selects the continuation button from the selection dialogue (continuation in S24), the number of repetitions (N) of the recovery printing is overwritten with "0", and then the processing proceeds to step S7 to perform the processing for the recovery printing processing.

On the other hand, in a case where the operator selects the interruption button from the selection dialog (interruption in S24), the processing is temporarily interrupted. Thereafter, the operator performs head cleaning, head repair, or the like. Thereafter, the processing is started again from step S1A.

Note that the user can select, at the start of the job, one of the processing illustrated in FIG. 9 in which the temporary stop is not performed at the time of the recovery printing and the processing illustrated in FIG. 10 in which the temporary stop is performed at the time of the recovery printing. In addition, the selection dialog may be displayed on the operation display 220 of the image forming apparatus 20 or on the display 630 of the inspection device 60.

In the image forming system 1 according to the first embodiment described above, upon detection of the abnormal image through comparison between the reference image 26*a* and the inspection image 26*b*, the abnormal nozzle detection chart is printed. Then, when the inspection device 60 detects the abnormal nozzle based on the read image of the abnormal nozzle detection chart, the control device 50 performs the abnormal nozzle complementation processing to complement the detected abnormal nozzle. Thus, it is possible to reduce the occurrence of abnormal printed product due to the abnormal nozzle with less frequent abnormal nozzle detection. In addition, the image forming system 1 does not perform the conventional processing of periodically printing the inspection chart in a situation where no abnormal nozzle occurs, which avoids wasteful consumption of ink and a printing medium. In addition, in the image forming system 1, the recovery printing is performed after the abnormal nozzle complementation processing. Furthermore, in the image forming system 1, head cleaning is not performed during a series of the processing from the detection of the abnormal image to the abnormal nozzle complementation processing. Hence, it is possible to reduce the waste amount of ink used in head cleaning and to reduce the processing time required for the recovery printing.

In addition, in the image forming system 1, through the abnormal nozzle complementation processing, not only a streak but also other abnormalities occurring in the printed image are complemented at the time of the recovery printing. Hence, in the image forming system 1, it is possible to reduce the processing time required for the recovery printing when an image abnormality other than a streak occurs. In addition, in the image forming system 1, since the abnormal nozzle complementation processing is immediately performed upon the detection of the abnormal nozzle, the printed product having an abnormality is not mass-produced different from the conventional processing.

In addition, in a case where an abnormal image has been detected after a plurality of times of the abnormal nozzle complementation processing and the recovery printing, the selection dialog for causing the operator to instruct whether or not to continue the abnormal nozzle complementation processing and the recovery printing is displayed. The operator can instruct continuation or interruption of the abnormal nozzle complementation processing and the recovery printing with pressing the continuation button or the interruption button in the selection dialog. When the operator instructs the interruption, head cleaning, head replacement, or the like is performed, so that it is expected that an abnormal image is not generated in the next and subsequent printing processing.

Second Embodiment

Next, a configuration example of an image forming system according to a second embodiment of the present invention will be described.

Figure 12:
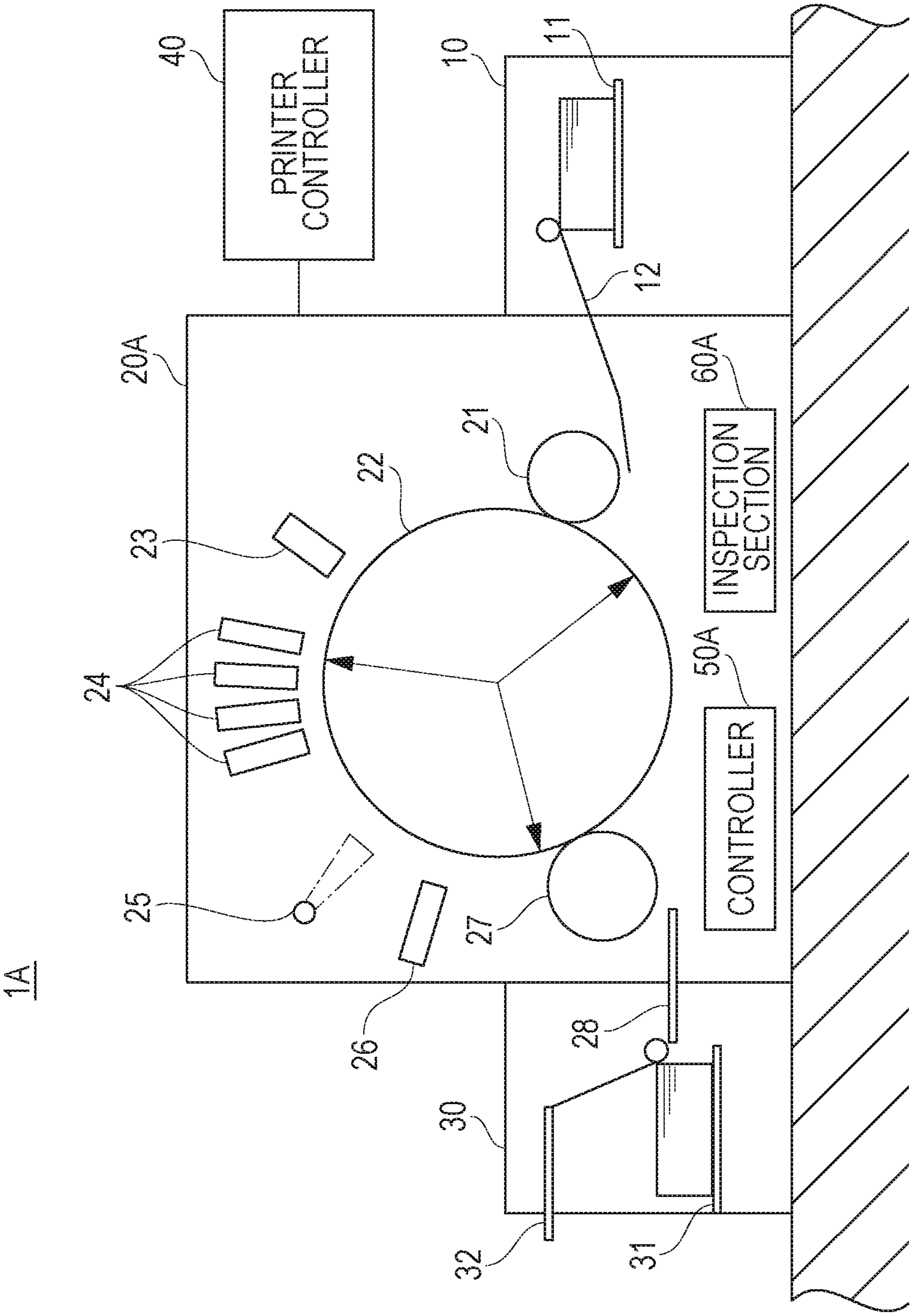
FIG. 12 is a schematic view illustrating an overall configuration of an image forming system according to a second embodiment of the present invention.

FIG. 12 is a schematic view illustrating an overall configuration of an image forming system 1A according to the second embodiment of the present invention.

The image forming system 1A includes a sheet feed device 10, an image forming apparatus 20A, a sheet ejection device 30, and a printer controller 40.

The image forming apparatus 20A includes, in addition to the functional sections included in the image forming apparatus 20 according to the first embodiment, a controller 50A and an inspection section 60A. Functions of the controller 50A are similar to those of the control device 50 illustrated in FIGS. 1 and 4. In addition, functions of the inspection section 60A are similar to those of the inspection device 60 illustrated in FIGS. 1 and 4. Then, the functions of the controller 50A and the inspection section 60A are implemented by a controller 200 of the image forming apparatus 20A including the same configuration as the image forming apparatus 20 illustrated in FIG. 5.

In the image forming system 1A according to the second embodiment, a print job is transmitted to the printer controller 40 from a terminal device (not illustrated). Then, the printer controller 40 transmits, to the image forming apparatus 20A, image data on which the RIP processing and the color correction are performed.

The subsequent processing of image formation, image reading, inspection of the reference image 26*a* and the inspection image 26*b*, abnormal nozzle detection chart print, abnormal nozzle detection, abnormal nozzle complementation, and recovery printing of the image are similar to the processing performed by functional sections of the image forming system 1 according to the first embodiment.

In the above-described image forming system 1A according to the second embodiment, the image forming apparatus 20A includes the controller 50A and the inspection section 60A. Hence, compared with the image forming system 1 according to the first embodiment, the system configuration of the image forming system 1A according to the second embodiment can be simplified.

Note that the image forming apparatus according to each of the above-described embodiments is an example of a single pass UV inkjet printer, but the present invention can also be applied to a printer such as an inkjet printer that uses ink other than UV ink, LED printer and the like to reduce time required for recovery processing.

Although embodiments of the present invention have been described and illustrated in detail, the disclosed embodiments are made for purposes of illustration and example only and not limitation. The scope of the present invention should be interpreted by terms of the appended claims.

For example, in the above-described embodiments, the configuration of the system has been described in detail and specifically for easy understanding of the present invention, and the present invention is not necessarily limited to a system including all of the configuration described herein. In addition, a part of the components of each of the present embodiments can be added, deleted, or replaced with another components.

In addition, control lines and information lines that are considered to be necessary for description are indicated, and all of the control lines and information lines in a product are not necessarily indicated. In practice, it may be considered that almost all of the components are connected to each other.

What is claimed is:

1. An image forming system comprising:

an image forming device that ejects ink from nozzles based on image data and performs image forming processing to form images on printing media;

a read image generator that generates read images from the images on the printing media;

an abnormal image detector that detects an abnormal image from an inspection image that is read from a first printing medium on which the inspection image is formed and no abnormal nozzle detection image is formed; and an abnormal nozzle detector that detects, after the abnormal image has been detected, a nozzle in which an abnormality occurs as an abnormal nozzle based on an abnormal nozzle detection image read from a second printing medium on which the abnormal nozzle detection image is formed.

2. The image forming system according to claim 1, wherein the abnormal nozzle detection image is printed on the second printing medium after the abnormal image has been detected.

3. The image forming system according to claim 1, comprising:

a control device that performs complementing processing of the abnormal nozzle detected by the abnormal image detector.

4. The image forming system according to claim 3, wherein the control device allocates the ink to be ejected based on the image data from the abnormal nozzle to a nozzle adjacent to the abnormal nozzle.

5. The image forming system according to claim 3, wherein after the complementing processing is performed, the image forming device restarts the image forming processing.

6. The image forming system according to claim 5, wherein the abnormal image detector re-performs detecting the abnormal image using, as the inspection image, a read image generated by the read image generator from an image formed on the first printing medium by restarting the image forming processing after the complementing processing is performed.

7. The image forming system according to claim 6, wherein the control device further:

determines whether a number of times the abnormal image has been detected through the re-performing of detecting the abnormal image exceeds a predetermined number of times, and causes the image forming device to temporarily stop the image forming processing in a case of determining that the number of times the abnormal image has been detected exceeds the predetermined number of times.

8. The image forming system according to claim 7, wherein the predetermined number of times can be set by a user.

9. The image forming system according to claim 7, wherein after the image forming processing is temporarily stopped, the control device displays on a display a selection dialog for a user to select whether to perform the image forming processing again or to interrupt the image forming processing.

10. The image forming system according to claim 1, wherein the abnormal image detector compares a reference image with the inspection image and extracts a difference to detect the abnormal image, wherein the reference image is read from the first printing medium and serves as a reference for comparison among the read images.

11. The image forming system according to claim 10, wherein the reference image is acquired with the read image generator by reading an image firstly formed on the first printing medium based on a job executed by the image forming device.

12. The image forming system according to claim 10, wherein after forming the image used as the reference image on the printing medium, the image forming device temporarily stops the image forming processing.

13. The image forming system according to claim 12, further comprising:

a control device that displays, after the image forming processing is temporarily stopped, at least one of the read images on a display.

14. The image forming system according to claim 10, wherein the reference image is the image data to be transferred to the image forming device.

15. The image forming system according to claim 14, wherein the abnormal image detector performs image processing on the image data used as the reference image.

16. The image forming system according to claim 15, wherein the image processing includes at least one of resolution conversion and color conversion.

17. An image forming method comprising:

generating read images from images formed on printing media by an image forming device that ejects ink from nozzles based on image data;

detecting an abnormal image from an inspection image that is read from a first printing medium on which the inspection image is formed and no abnormal nozzle detection image is formed; and detecting, after the abnormal image has been detected, a nozzle in which an abnormality occurs as an abnormal nozzle based on an abnormal nozzle detection image read from a second printing medium on which the abnormal nozzle detection image is formed.

18. A non-transitory computer readable recording medium storing instructions for causing a computer to execute:

generating read images from images formed on printing media by an image forming device that ejects ink from nozzles based on image data;

detecting an abnormal image from an inspection image that is read from a first printing medium on which the inspection image is formed and no abnormal nozzle detection image is formed; and detecting, after the abnormal image has been detected, a nozzle in which an abnormality occurs as an abnormal nozzle based on an abnormal nozzle detection image read from a second printing medium on which the abnormal nozzle detection image is formed.

* * * * *